No. 874,702. PATENTED DEC. 24, 1907.
E. J. PATTON.
GASKET OR WASHER CUTTER.
APPLICATION FILED MAR. 25, 1907.
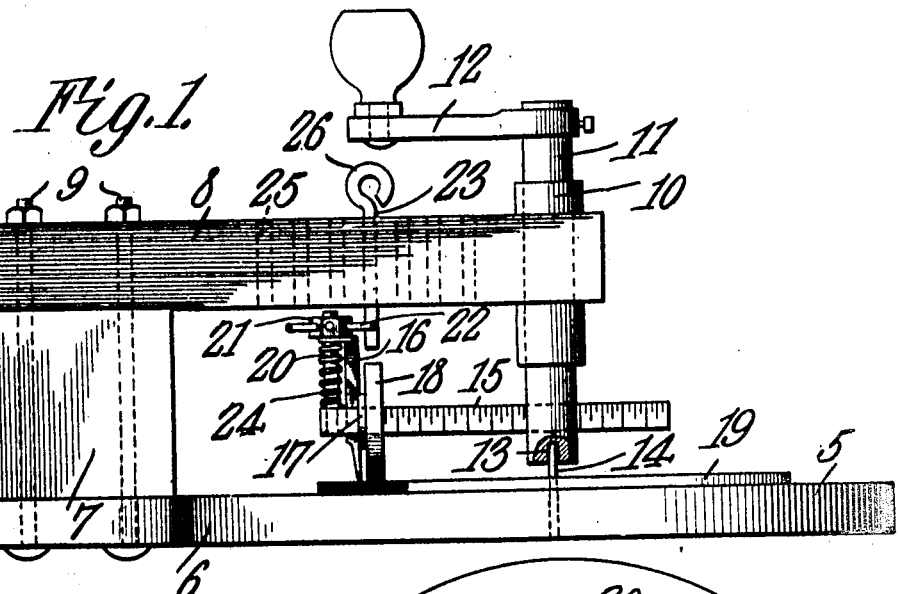
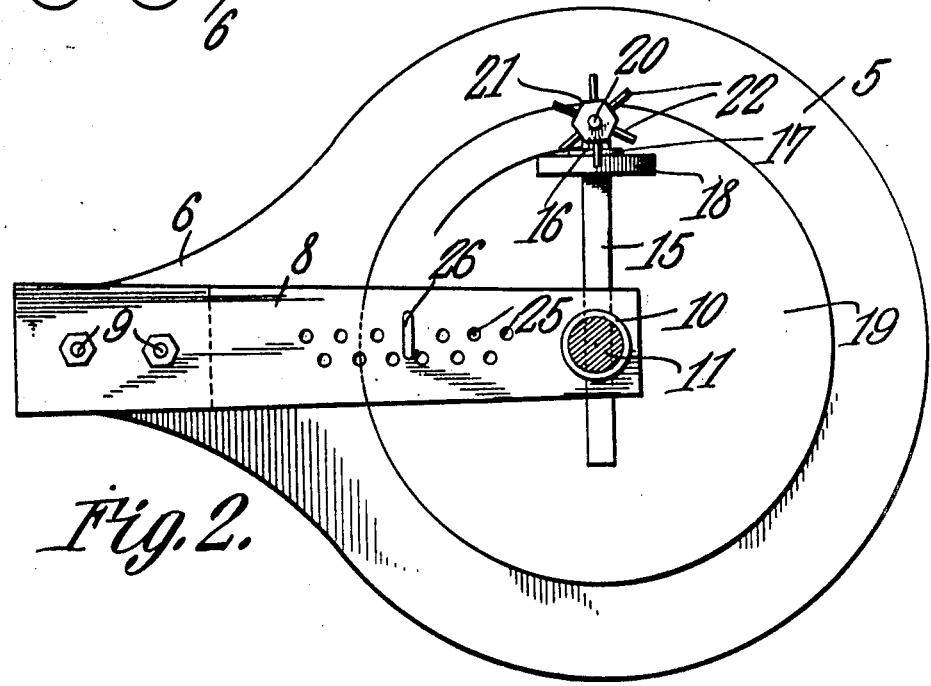
WITNESSES:
Elias J. Patton, INVENTOR.
By C. A. Snow & Co.
ATTORNEYS

UNITED STATES PATENT OFFICE.

ELIAS J. PATTON, OF HASTINGS, NEBRASKA.

GASKET OR WASHER CUTTER.

No. 874,702.          Specification of Letters Patent.          Patented Dec. 24, 1907.

Application filed March 25, 1907. Serial No. 364,362.

*To all whom it may concern:*

Be it known that I, ELIAS J. PATTON, a citizen of the United States, residing at Hastings, in the county of Adams and State of Nebraska, have invented a new and useful Gasket-Cutter or Washer-Cutter, of which the following is a specification.

This invention relates to machines for cutting washers or gaskets and has for its object to provide a strong, durable and comparatively simple machine of this character in which the cutting tool is mounted for rotation over the surface of the work and adjustable laterally of the cutter bar thereby to permit the formation of washers or gaskets of different thicknesses.

A further object of the invention is to provide means for centering the work on the supporting table, and means for feeding the cutter automatically to the work.

A still further object of the invention is to generally improve this class of machines so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of a washer or gasket cutting machine constructed in accordance with my invention. Fig. 2 is a top plan view of the same.

Similar numerals of reference indicate corresponding parts in all of the figures of the drawings.

The improved machine forming the subject matter of the present invention includes a supporting base or table 5 preferably circular in form, as shown, and having one end thereof reduced to form a neck or extension 6 on which is mounted a spacing block 7 carrying an over-hanging arm or bracket 8.

One end of the bracket or arm 8 is secured to the table 5 by bolts or similar fastening devices 9 while the opposite end thereof is provided with a vertically disposed opening in which is seated a bearing sleeve or collar 10.

Mounted for rotation in the sleeve or collar 10 is a vertically disposed operating shaft 11 one end of which is provided with a terminal crank handle 12 while the opposite end thereof is formed with a vertically disposed recess or bearing 13 for the reception of a centering pin 14.

The pin 14 extends through the bottom of the table or support 5 and is provided with a terminal point adapted to pierce the leather, rubber, fabric or other material of which the washers are formed, said pin also forming a journal for the lower end of the operating shaft 11.

The lower end of the operating shaft 11 is provided with a transverse recess in which is mounted for longitudinal movement a horizontally disposed cutter bar 15 having one face thereof graduated in inches and fractions thereof so as to permit the cutting tool 16 to be adjusted longitudinally of the bar thereby to permit the formation of washers or gaskets of different thicknesses.

The cutting tool 16 is mounted for vertical movement in a slot or recess in the adjacent end of the bar 15 and disposed adjacent said cutting tool and mounted for rotation on a sleeve or collar 17 is a wheel or roller 18 adapted to bear against the work 19 and hold the latter in engagement with the upper face of the table during the cutting or severing operation.

Extending vertically from one end of the cutter bar 15 is a rod or bolt 20 the upper or free end of which is threaded for engagement with a nut 21, the latter being provided with a plurality of radiating arms or fingers 22 which extend in the path of movement of a pin 23 carried by the over-hanging arm 8 and serve to automatically feed the cutter to the work in the manner hereinafter explained.

Interposed between the cutter bar 15 and the nut 21 is a coiled spring 24 one end of which is passed through an opening in the upper end of the cutting tool 16 and serves to normally and yieldably support the tool in elevated position.

The stop pin 23 is adapted to engage any one of a series of openings 25 formed in the over-hanging arm 8 so that when the cutter bar is adjusted transversely of the operating shaft 11 to permit the formation of gaskets or washers of different thicknesses the pin may be removed from one of the openings and placed in an adjacent opening so as to be in position to actuate the feeding device or nut 21 when the operating shaft is rotated.

The openings 25 are preferably disposed in staggered relation, as best shown in Fig. 2 of the drawings while the pin 23 is formed in an enlarged head or finger piece 26 by means of which the pin may be conveniently manipulated.

In operation the rubber, leather or other material is placed in position on the supporting table and centered with respect to the operating shaft 11 by means of the pin 14. The cutter bar 15 is then adjusted longitudinally and the stop pin placed in the proper opening in the over-hanging arm 8 after which the shaft is actuated by rotating the handle 12 thus revolving the cutter bar and causing the cutter to engage the upper surface of the work. As the cutter bar 15 revolves the fingers 22 on the feeding device or nut 21 will intermittently engage the adjacent end of the stop pin 23 and thus automatically rotate the feeding device or nut against the tension of the coiled spring 24, thereby exerting a downward pressure on the cutter 16 and automatically feeding the latter to the work, the wheel or roller 18 serving to prevent accidental displacement of the work during the cutting operation. As soon as one incision or cut has been made in the material the cutter bar is adjusted longitudinally the desired distance and the operation repeated thus forming the washer. After the washer has been formed the surplus material may be removed from the table or if desired a smaller washer may be formed from the surplus material in the manner before described.

In order to remove the surplus material from the supporting table it is merely necessary to exert an upward pull on the operating handle 12 which causes the shaft 11 to move longitudinally within the sleeve 10 and thus elevate the recessed end of the shaft 11 out of engagement with the pin so that the material may be readily detached from the latter and a new piece placed in positon on said table.

From the foregoing description it is thought that the construction and operation of the device will be readily understood by those skilled in the art and further description thereof is deemed unnecessary.

Having thus described the invention what is claimed is:

1. A machine of the class described including a work supporting table, an overhanging arm secured to the table and provided with a plurality of spaced openings, an operating shaft journaled in the free end of the arm, a cutter bar extending transversely through the operating shaft, a cutting tool secured to one end of the bar, a threaded rod carried by the cutter bar, a nut engaging the threaded end of the rod and provided with spaced radiating fingers, a spring interposed between the nut and cutter bar and operatively connected with the cutter, and a pin projecting through one of the openings in the over-hanging arm and adapted to engage the fingers on the nut for feeding the cutter to the work when the shaft is rotated.

2. A machine of the class described including a work supporting table having an over-hanging arm secured to one end thereof, a sleeve carried by the free end of the arm, an operating shaft journaled in the sleeve and provided with a terminal socket, a work centering pin secured to the table and engaging the socket, a cutter bar mounted for rotation with the shaft, a cutting tool slidably mounted for vertical movement on one end of the cutter bar, a threaded rod carried by the cutter bar, a nut engaging the threads on the rod and provided with spaced radiating fingers, a spring interposed between the nut and cutter bar and operatively connected with the cutter, and a stop pin depending from the over-hanging arm and adapted to engage the fingers on the nut for automatically feeding the cutter to the work.

In testimony that I claim the foregoing as my own, I have hereto affixed my signature in the presence of two witnesses.

ELIAS J. PATTON.

Witnesses:
 J. O. ROHRER,
 U. S. ROHRER.